E. C. FIELDS.
RAIL JOINT.
APPLICATION FILED MAR. 19, 1921.

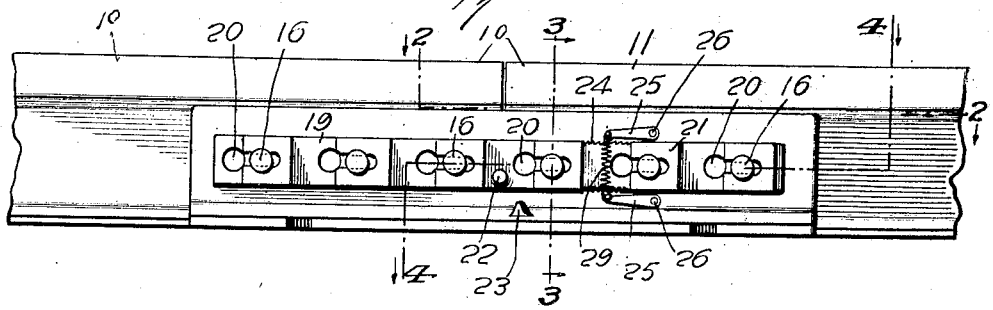
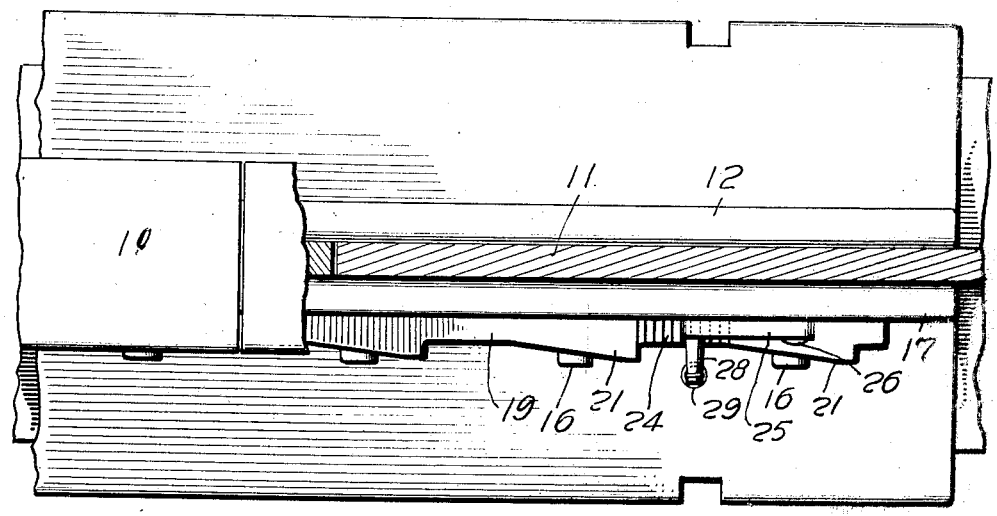
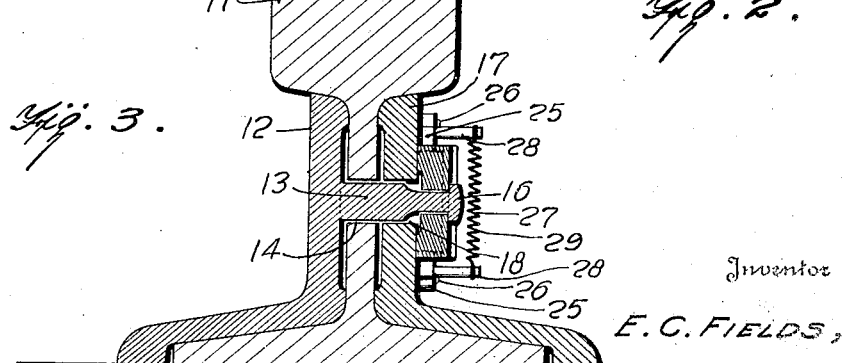

1,380,369.

Patented June 7, 1921.
2 SHEETS—SHEET 2.

Inventor
E. C. FIELDS,

Franklin H. Hough
Attorney

UNITED STATES PATENT OFFICE.

EDGAR CLARK FIELDS, OF LYONS, INDIANA.

RAIL-JOINT.

1,380,369. Specification of Letters Patent. Patented June 7, 1921.

Application filed March 19, 1921. Serial No. 453,694.

*To all whom it may concern:*

Be it known that I, EDGAR C. FIELDS, citizen of the United States, residing at Lyons, in the county of Greene and State of Indiana, have invented certain new and useful Improvements in Rail-Joints, of which the following is a specification, reference being had therein to the accompanying drawings.

This invention relates to rail joints and has for an object to provide a joint having fish plates of modified type with a wedging member for acting in conjunction with the fish plates, and means for setting and releasing the wedging member.

A further object of the invention is to provide a fish plate having lugs properly proportioned and positioned to extend through the holes ordinarily provided in rail ends, with a second fish plate having openings to fit over said lugs, which are provided with cut-outs forming heads and with a member providing a plurality of wedge sections fitting over and engaging the heads which is moved longitudinally to exert stress, and with improved means for locking the wedge member.

With these and other objects in view, the invention comprises certain novel units, elements, parts, combinations and mechanical movements, as are disclosed in the drawings, and will be hereinafter more fully described and claimed together with all equivalents thereof.

In the drawings:

Figure 1 is a view in side elevation of proximate rail ends with the joint applied thereto shown in side elevation, locked;

Fig. 2 is a longitudinal horizontal sectional view through the web of the rail showing the fish plates in top plan, as indicated by line 2—2 of Fig. 1;

Fig. 3 is a transverse sectional view taken on line 3—3 of Fig. 1;

Like characters of reference indicate corresponding parts throughout the several views.

Figure 4:
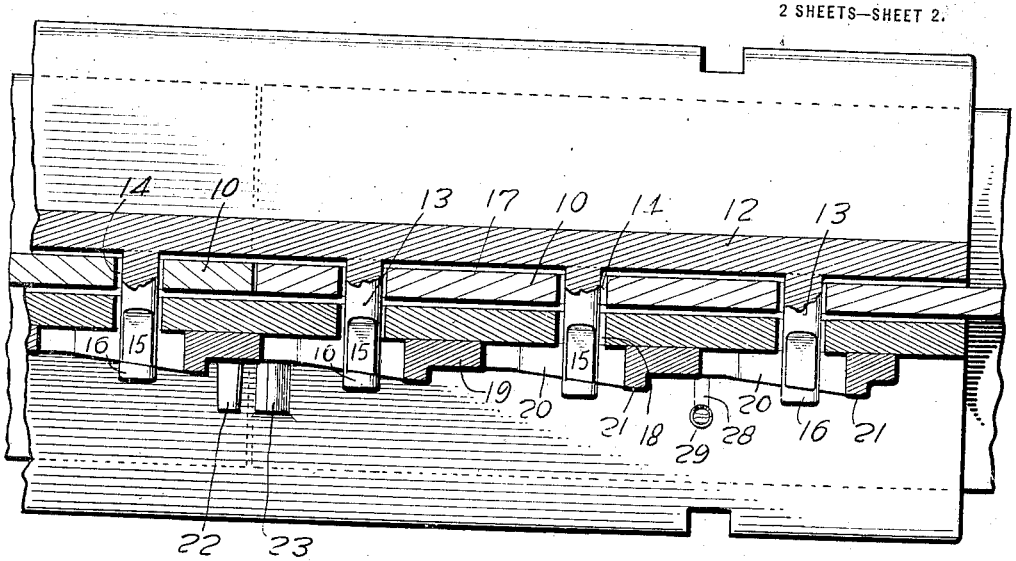
Fig. 4 is a longitudinal horizontal section through the joint substantially on the median line, as indicated by line 4—4 of Fig. 1.

The improved rail joint which forms the subject matter of the present application comprises, with the proximate rail ends 10 and 11, a pair of fish plates which engage upon the opposite sides of the web of the rail. One of the fish plates, that indicated at 12, is provided with a plurality of lugs 13, properly proportioned to extend through the perforations 14 of the proximate rail ends. The lugs 13 are of such length as to extend a considerable distance from the web of the rail upon the side opposite the fish plate 12, as indicated more particularly at Figs. 3 and 4. The lugs are provided with cut-out portions 15 forming heads 16.

A second fish plate 17 is provided having a plurality of perforations 18 properly proportioned and spaced to receive and embrace the lugs 13 with the heads 16 extending beyond the remote side of the plate 17.

Figure 6:
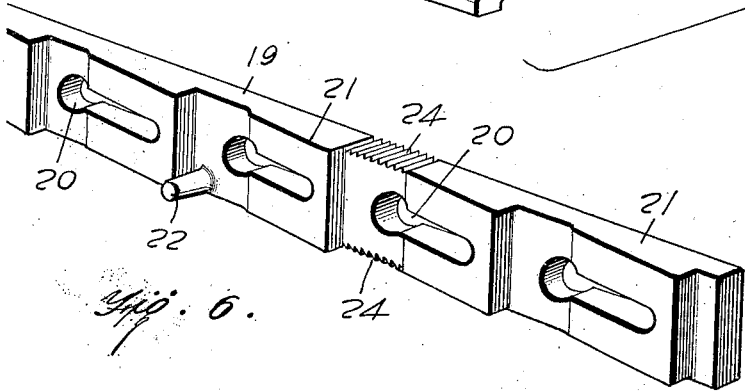
Fig. 6 is a perspective view of the wedge member.

A wedge member, indicated as an entirety at 19 in Fig. 6, is provided, having a plurality of key-hole slots 20 adapted to pass over the heads 16 of the lugs 13, and the narrower part of the slots to slide along the cut-out portions of said lugs. The narrower portions of the key-hole slots 20 are formed through wedging sections 21 so that a longitudinal movement of the wedging member 19 relative to the lugs 13 moving said member in the direction of the inclination of the wedging portions 21 causes said wedging portions to engage back of the heads 16 and exert clamping stress upon the fish plate 17 against which it bears.

For the purpose of exerting such longitudinal movement, the wedge member 19 is provided with the lug 22 and the fish plate 17 is provided with an abutment 23, the lug 22 and abutment 23 being so positioned that a crow-bar may be properly inserted to exert stress upon the lug 22 to be transmitted to and to move the wedge member 19.

Figure 5:
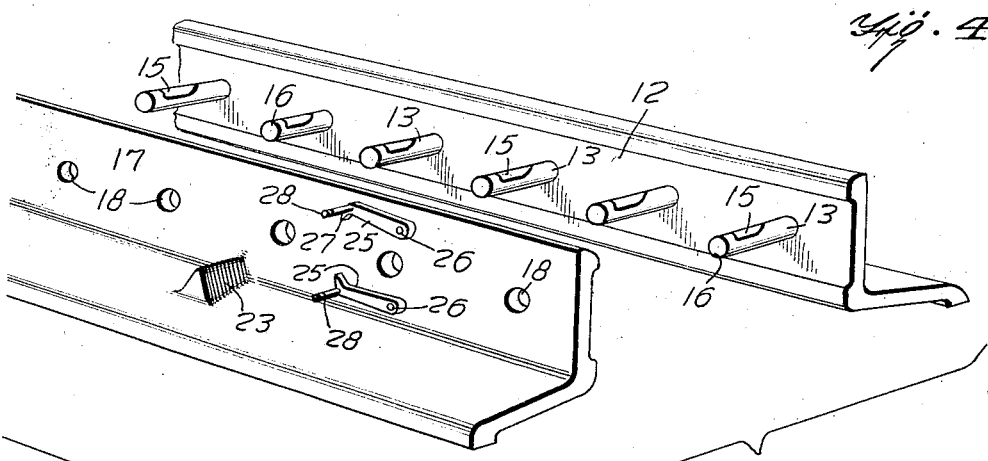
Fig. 5 is a perspective view of the two fish plates separated and removed from the rail joint.

To maintain the wedge member in clamping position when secured by application of the lever thereto, a plurality of ratchet teeth 24 are provided along both the top and the bottom wedge member 19 throughout a limited section of its length, and detents 25 are pivoted at 26 to the fish plate 17. The detents 25 are provided with noses 27 proportioned to engage the ratchet teeth 24, as indicated more particularly at Figs. 5 and 6, and are also provided with outstanding fingers 28 between which a spring 29 is tensioned, tending to draw the detents 25 to bring the noses 27 into locking engagement with the ratchet teeth 24.

By reason of the inclination of the ratchet teeth 24 and the noses 27 it is obvious that the movement of the wedge member 19 in the direction indicated by the arrow at Fig. 1, will be only slightly resisted, permitting the clamping of the rail joints between the fish plates 12 and 17 thereby, but said teeth will firmly resist any retroactive movement of the wedging member until the detents 25 are manually separated by the insertion of some implement therebetween. This being accomplished, the wedging member may be easily removed from its clamping position and its engagement with the lugs 13 and the fish plates 12 and 17 overcome, releasing the rail ends thereby.

What I claim to be new is:

The combination with proximate rail ends provided with spaced perforations, of a fish plate provided with outstanding lugs positioned and proportioned to be inserted through the perforations, a second fish plate provided with perforations properly spaced to pass over the lugs, a wedging member, means providing wedging action between the wedging member and the lugs as the wedge moves longitudinally, a lug carried by the wedging member, and an abutment carried by the fish plate so positioned relative to each other as to facilitate the insertion of a lever therebetween to exert stress upon the wedging member.

In testimony whereof I hereunto affix my signature in presence of two witnesses.

EDGAR CLARK FIELDS.

Witnesses:
    JOHN W. FIELDS,
    HARRISON RIGGINS.